(12) United States Patent
Ganta et al.

(10) Patent No.: US 10,671,800 B2
(45) Date of Patent: Jun. 2, 2020

(54) PROVIDING WAY TO STORE PROCESS DATA OBJECT STATE AS SNAPSHOTS AT DIFFERENT POINTS OF PROCESS

(71) Applicant: Oracle International Corporation, Redwood Shores, CA (US)

(72) Inventors: Suman Ganta, Fremont, CA (US); Nikhil Sabharwal, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 153 days.

(21) Appl. No.: 15/696,515

(22) Filed: Sep. 6, 2017

(65) Prior Publication Data

US 2018/0075000 A1 Mar. 15, 2018

Related U.S. Application Data

(60) Provisional application No. 62/395,293, filed on Sep. 15, 2016.

(51) Int. Cl.

| | |
|---|---|
| *G06F 17/22* | (2006.01) |
| *G06F 17/24* | (2006.01) |
| *G06F 40/123* | (2020.01) |
| *G06F 16/11* | (2019.01) |
| *G06F 40/174* | (2020.01) |
| *G06T 11/20* | (2006.01) |

(52) U.S. Cl.
CPC .......... *G06F 40/123* (2020.01); *G06F 16/128* (2019.01); *G06F 40/174* (2020.01); *G06T 11/206* (2013.01)

(58) Field of Classification Search
CPC .......................... G06F 17/2205; G06F 17/243
See application file for complete search history.

(56) References Cited

U.S. PATENT DOCUMENTS

| | | | |
|---|---|---|---|
| 7,900,142 B2 * | 3/2011 | Baer ................. | G06F 17/24 707/639 |
| 2006/0036964 A1 * | 2/2006 | Satterfield ........... | G06F 3/0481 715/777 |
| 2006/0061547 A1 * | 3/2006 | Bramwell ............ | G06Q 10/06 345/156 |
| 2007/0260996 A1 * | 11/2007 | Jakobson ............ | G06F 17/2288 715/781 |
| 2007/0266368 A1 * | 11/2007 | Szpak ................. | G06F 8/10 717/105 |
| 2008/0256172 A1 * | 10/2008 | Hebert ................ | G06Q 10/06 709/202 |
| 2009/0077217 A1 * | 3/2009 | McFarland ........... | G06Q 10/06 709/223 |

(Continued)

*Primary Examiner* — Scott T Baderman
*Assistant Examiner* — Mario M Velez-Lopez
(74) *Attorney, Agent, or Firm* — Trellis IP Law Group, PC

(57) ABSTRACT

Various embodiments provide for obtaining snapshots of a form. A process design that specifies stages of a lifecycle of a process and a point between the stages is created. Electronic computer executable snapshot instructions for obtaining a snapshot of a form that is part of the process are received. The snapshot instructions are associated with the point. In response to displaying the form on a display screen, a snapshot of the form is obtained at the point that is between the stages the lifecycle of the process based on execution of the snapshot instructions.

20 Claims, 6 Drawing Sheets

(56) References Cited

U.S. PATENT DOCUMENTS

| | | | | |
|---|---|---|---|---|
| 2010/0161558 A1* | 6/2010 | Goldberg | ............... | G06Q 10/06 |
| | | | | 707/639 |
| 2010/0250499 A1* | 9/2010 | McAlister | ........... | G06F 11/1451 |
| | | | | 707/679 |
| 2013/0227641 A1* | 8/2013 | White | .................... | H04L 63/20 |
| | | | | 726/1 |
| 2015/0143064 A1* | 5/2015 | Bhargava | ............ | G06F 11/1451 |
| | | | | 711/162 |
| 2015/0220308 A1* | 8/2015 | Condon | ................... | G06F 8/20 |
| | | | | 717/104 |
| 2018/0276189 A1* | 9/2018 | Bache | ................... | G11B 27/34 |

* cited by examiner

PROVIDING WAY TO STORE PROCESS DATA OBJECT STATE AS SNAPSHOTS AT DIFFERENT POINTS OF PROCESS

CROSS REFERENCES TO RELATED APPLICATIONS

This application claims priority from, and the benefits of U.S. Provisional Patent Application Ser. No. 62/395,293, entitled PROVIDING WAY TO STORE PROCESS DATA OBJECT STATE AS SNAPSHOTS AT DIFFERENT POINTS OF PROCESS, filed on Sep. 15, 2016 (ORACP0186P/client ref. ORA170384-US-PSP), which is hereby incorporated by reference as if set forth in full in this application for all purposes.

This application is related to the following application, U.S. Provisional Application Ser. No. 62/395,341, entitled SYSTEM FOR PROCESS CLOUD SERVICE, filed on Sep. 15, 2016 (Trellis ref ORACP0192P/Client ref. ORA170390-US-PSP), which is hereby incorporated by reference as if set forth in full in this application for all purposes.

BACKGROUND

A human workflow has a lifecycle that typically involves a large amount of data throughout the lifecycle of that process. For example, a human workflow starts when a process is initiated and goes through various human interactions until the different stages (also referred to as "events") of the process's lifecycle are completed. There are different stages of the process from the start to the end. Examples of a process' lifecycle stages include starting the task associated with the process, assigning responsibility for the task to someone, and completing the task. Many iterations of human activity may be involved with that form throughout the lifecycle of the process. For example, there may be ten different users working on that form during the lifecycle of that process. Each person is adding their respective information or updates into the form. A process may include one or more tasks and one or more forms may be used to implement each task of the process. There is a need for tracking the information associated with a process due to people entering information and updates to forms associated with a process.

SUMMARY

A further understanding of the nature and the advantages of particular embodiments disclosed herein may be realized by reference of the remaining portions of the specification and the attached drawings.

Various embodiments provide for storing process data object state as snapshots at different points of a process. In one embodiment, a process design that specifies stages of a lifecycle of a process and a point between the stages is created. Electronic computer executable snapshot instructions for obtaining a snapshot of a form that is part of the process are received. The snapshot instructions are associated with the point. In response to displaying the form on a display screen, a snapshot of the form is obtained at the point that is between the stages the lifecycle of the process based on execution of the snapshot instructions.

An embodiment provides for a non-transitory computer readable medium including instructions for a method of providing snapshots of a form executable by a digital processor, the non-transitory computer readable medium including one or more instructions for: creating a process design that specifies stages of a lifecycle of a process and a point between the stages; receiving electronic computer executable snapshot instructions for obtaining a snapshot of a form that is part of the process; associating the snapshot instructions with the point; and in response to displaying the form on a display screen, obtaining a snapshot of the form at the point that is between the stages the lifecycle of the process based on execution of the snapshot instructions.

DETAILED DESCRIPTION OF EMBODIMENTS

Overview of Discussion

Figure 1:
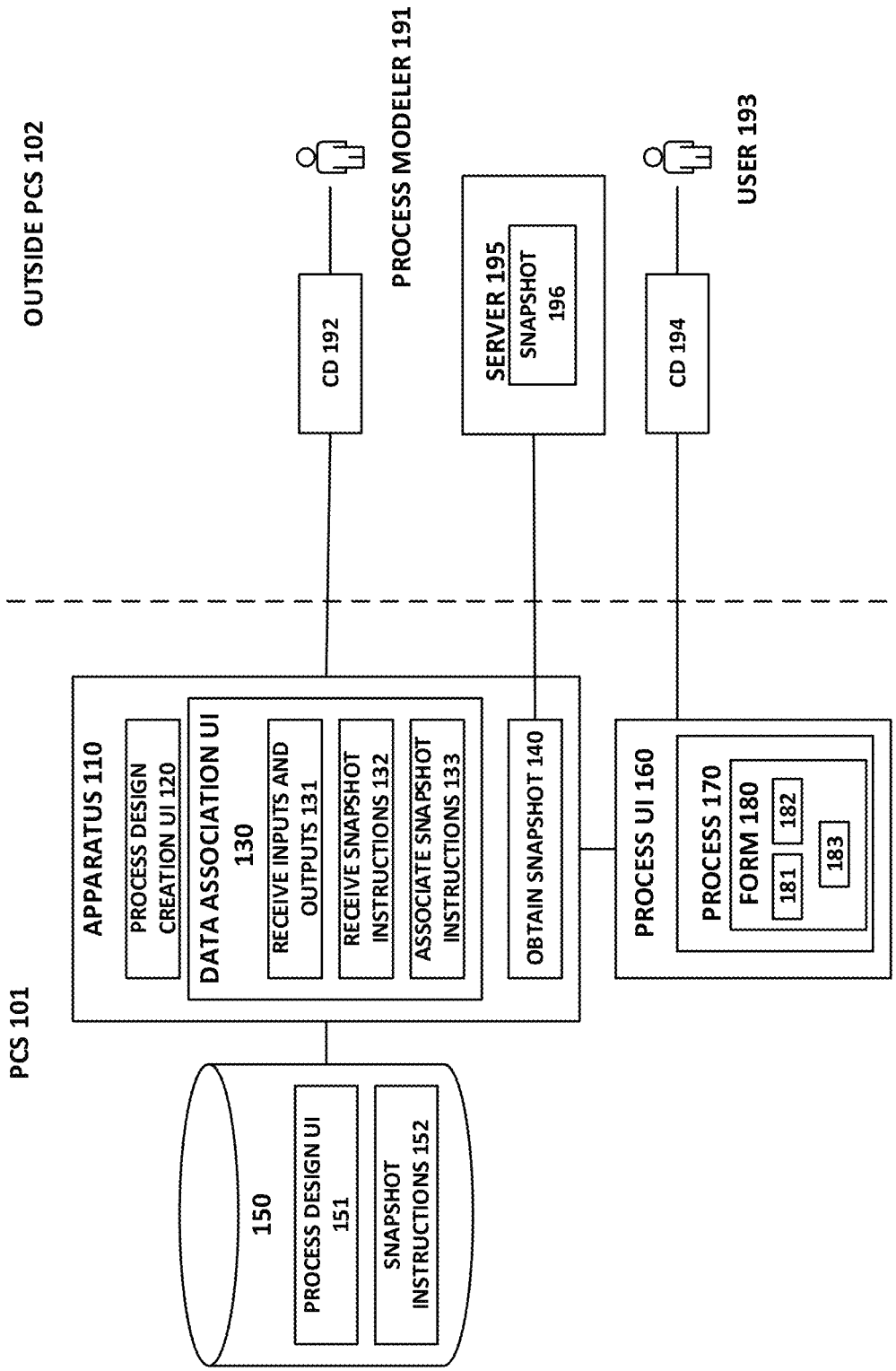
FIG. 1 depicts a block diagram of a system for providing snapshots of a form, according to one embodiment.

Various embodiments pertain to a lifecycle of a process of a human workflow. A human workflow has a lifecycle that typically involves a large amount of data collected throughout the lifecycle of that process. According to various embodiments, a way is provided to create a snapshot of that form at different points in time of the process. Book keeping can be used to see what all of the users, or a subset of the users, did with respect to the process, for example, when the process ends. A way is provided for human users, such as customers, of the process to obtain process data outside of the process and to store the snapshot on their local file system or database or anywhere else that they want so they can use it for book keeping later on.

A person can look at certain data of the task and make a decision as to whether to continue with the task or see various aspects of the task. The data undergoes many changes throughout the lifecycle. According to various embodiments, a user, such as a process modeler, can take a snapshot of task data at any time depending on the use he is interested in.

Conventionally, snapshots were only taken at known lifecycle events, such as when the task is started, when the task is assigned to someone, or the task is completed. Conventionally, systems only had knowledge of known lifecycle events for the purpose of taking snapshots. In contrast, various embodiments, provide a programmatic way of snapshotting a form that is under transformation at any given time that the user, such as a process modeler, wants.

Further, conventionally, the data was in a raw format, like an internal representation such as Extensible Markup Language (XML) or JavaScript Object Notation (JSON). In contrast, a process modeler can program a system to take a snapshot of the form data in a user friendly way that can be rendered in a user friendly and easily understandable way. For example, according to various embodiments, snapshots are formatted as Portable Document Formats (PDFs) or Portable Game Notations (PGNs). Therefore, according to one embodiment, snapshots are not required to be in an internal representation intended for systems, however, they can be used internally by systems, for example, by converting their information to internal presentations used by systems.

In an illustration, a snapshot could be taken of a form with its data at a point in the process that is not at a given stage or event of the process's life cycle. For example, a snapshot could be taken of the form at a point in time when a human would not have clicked a button, such as OK, submit, done, indicating that the task is at a known lifecycle event or stage, such as started, assigned, or completed. The snapshot can be saved inside or outside of process cloud services (PCS). The snapshot can be used for various purposes at a later point in time. Various embodiments provide for programming the system to automatically take such snapshots at various points in time that can be between stages of the process.

Illustration of a System

FIG. 1 depicts a block diagram of a system for providing snapshots of a form, according to one embodiment.

The blocks that represent features in FIG. 1 can be arranged differently than as illustrated, and can implement additional or fewer features than what are described herein. Further, the features represented by the blocks in FIG. 1 can be combined in various ways. The system 100 can be implemented using software, hardware, hardware and software, hardware and firmware, or a combination thereof. Further, unless specified otherwise, various embodiments that are described as being a part of the system 100, whether depicted as a part of the system 100 or not, can be implemented using software, hardware, hardware and software, hardware and firmware, or a combination thereof.

System 1 includes PCS 101 and a portion 102 that is outside of PCS. PCS 101 includes an apparatus 110, hardware memory 150, and a process user interface 160. The Apparatus 110 includes a process design creation user interface 120, a data association user interface 130, and obtain snapshot logic 140. The data association user interface 130 includes receive inputs and outputs logic 131, receive snapshot instructions logic 132, and associate snapshot instructions logic 133. The process user interface 160 includes a process 170. The process 170 includes one or more forms 180. The one or more forms 180 include user interface controls for starting a process 181, a submit 182, and ending a process 183. Although, for the sake of simplicity, the user interface controls 181-182 are depicted on the same form 180, embodiments are well suited for the user interface controls 181-182 to be on different forms and taking snapshots of one or more of those forms. The hardware memory 150 stores the process design user interface 151 (also referred to herein as "process design") and the snapshot instructions 152. The outside PCS portion 102 includes a client device 192, a client device 194, and a server 195. The process modeler 191 interacts with the client device 192 and the user 193 interacts with the client device 194. The process modeler 191 and the user 193 are examples of customers of PCS. The apparatus 110 communicates with the hardware memory 150, the process UI 160 and the server 195. The client device 192 communicates with the apparatus 110. The client device 194 communicates with the process user interface 160.

The process modeler 191 interacts with the process design creation user interface 120 and the data association user interface 130 via the client device 192. For example, the process modeler 191 creates the process design user interface 151 with the process design creation user interface 120 displayed on the client device 192. Further, the process modeler 191 interacts with the data association user interface 130 displayed on the client device 192. The receive snapshot instructions logic 132 receives the snapshot instructions 152 the process modeler 191 enters using the data association user interface 130 and stores the snapshot instructions 152 in the hardware memory 150.

The user 193 interacts with the process user interface 160 via the client device 194. For example, the user 193 interacts with the user interface controls 181-183 while the form 180 is displayed on the client device 194. The obtain snapshot 140 causes the snapshot instructions 152 to be executed based on the process design user interface 151 and the snapshot to be stored outside PCS 102 as snapshot 196. The server 194 stores the snapshot 196 that is taken of the form 180 based on the execution of the snapshot instructions 152 at a point between stages of the process 170's lifecycle as specified in the process design user interface 151.

The snapshot instructions 152 and the process design user interface 151 are examples of data structures. The data structure 151 would include inputs and outputs for each lifecycle stage and human activity with respect to a form as well as an association between at least one service, which is between two of the lifecycle stage, and the snapshot instructions 152, as discussed herein. A "human activity" with respect to a form is also referred to as a "human interaction" with respect to the form.

One use case involves a process modeler uploading a snapshot of a form to a storage place for archival and auditing purpose. Another use case is maintaining book keeping on user interactions with forms. More specifically, the users may be employees of a business that uses PCS. The book keeping could be used for internal purposes or external purposes, such as providing legal evidence of activities. Various embodiments enable a process modeler to access the state of the process data at different points of a process' lifecycle.

Snapshot Instructions

Referring to FIG. 1, examples of snapshot instructions 152 are XPath and getWebForm function, as depicted in Table 1. A process modeler 191 can specify the snapshot instructions 152 for obtaining a snapshot 196.

A user, such as a data modeler 191, is provided with a way to create snapshots of process data objects at different points of a process and to store the snapshots outside of the PCS application, for example, via service calls. This allows a hook to customers to store the history of a data object as it moves between different process activities. According to one embodiment, an Xpath model is used to obtain payload data and create a base64 stream of PDF or PGN files which can be stored in an external system outside of PCS.

According to one embodiment, form stream accessibility is enabled within a process to enable users to access various user interface controls (also called "facets") of forms using snapshots of the forms in formats, such as png and pdf. A user interface control can be a feature displayed on a form that a user might interact with. Various examples of a user interface control include a data entry field, buttons, tabs, check boxes, drop down menus, and so on. An Xpath function is created to access form stream. This allows customers to store their data outside the context of a PCS application.

According to one embodiment, PCS during runtime adds a new XPath function that gives access to the form stream.

TABLE 1

Pseudocode for an XPath function to access the form stream, according to one embodiment.

Form.getWebForm(dataObject,[format],[formName])
formName (String) - optional - if not given, find out associated form from given dataObject (check start form data object)
dataObject (XMLElement/XMLType) - this can either be data object or task payload object
format (String) - optional - valid values are 'PDF' or 'PNG'. Defaults to 'PDF'

This xpath can be used in data associations to retrieve the form as a stream where the form is formatted as PDF/PNG. This stream can be used by service activities to send the form stream to external systems that are outside of PCS.

An XPath function can be used to access the form stream. When a programmer, such as a process modeler, is designing the form, they can write a function using XPath. The process modeler can use the Xpath function to access the form stream. The getWebForm depicted in Table 1 enables the process modeler to specify the form name and the format, such as pdf or pgn.

A process modeler can use the xpath function to instruct the system to take a snapshot. For example, a process may involve ten different forms. The process modeler may program a system with the XPath function to take one or more snapshots of the ten different forms. The process modeler can write snapshot instructions specifying the form's name, etc, for each of the ten forms. According to one embodiment, a snapshot is an xpath string.

When a process is designed, different human tasks can be created as part of that process. There are activities that can interact outside of PCS. For example, the snapshot can be stored on a server that is outside of PCS. Further, the snapshot may be stored on a server inside of PCS.

According to one embodiment a getWebForm function is converted into XPath.

The following are two examples of getWebForm service calls for obtaining a snapshot.

Form.getWebForm(bpmn:getDataObject('customer'), 'PDF', 'f1')—this returns PDF stream of form 'f1'. "bpm" can be replaced by "pcs."

Form.getWebForm(bpmn:getDataObject('customer'))—Figures out associated form of data object 'customer' as 'f1' and returns f1 snapshot as PDF stream.

According to one embodiment, the simple expression grammar is enhanced to introduce 'form' as a simple expression function so that process developers can leverage various embodiments, for example, using the getWebForm function depicted in Table 1, without understanding the XPath language.

Process Design User Interface

Figure 2:
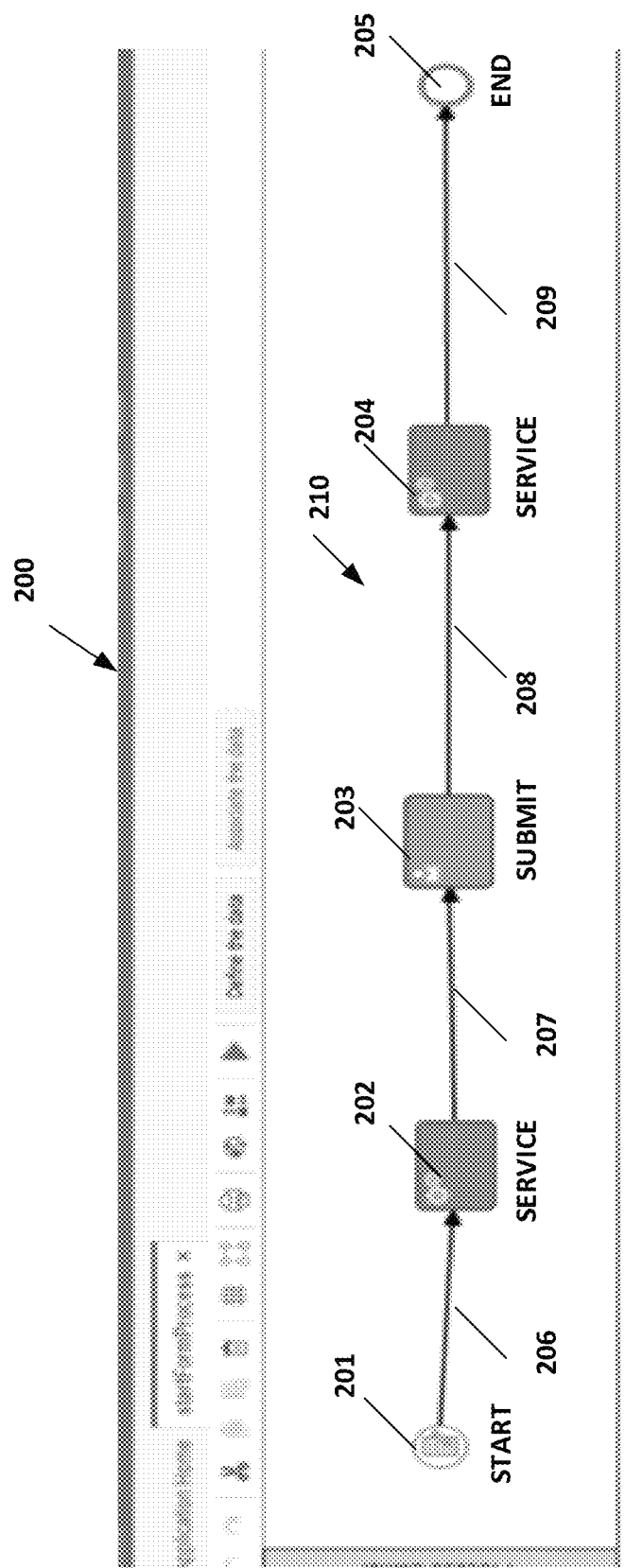
FIG. 2 is a block diagram of a user interface for designing a process, according to one embodiment.

FIG. 2 is a block diagram of a process design user interface for designing a process, according to one embodiment. The user interface 200 is an example of the process design user interface 151 (FIG. 1) for designing the process 170.

The computer executable instructions for the process design user interface are stored at 151 (FIG. 1). When the instructions at 151 are executed, a user interface as depicted in FIG. 2 is displayed.

As depicted, the process graph 210 includes activities 201-205 of a process 170 (FIG. 1). Start activity icon 201 represents the start of the process 170 (FIG. 1). End activity icon 205 represents the end of the process 170. Services activities 202, 204 represent services that the system performs, such as taking a snapshot of a form 180 (FIG. 1). The service activity 202, 204 can represent storing a snapshot inside and/or outside of PCS. The human activity 203 represents a human performing an activity with respect to a form, such as submitting the form. The human activity 203 could be any type of activity that a human may perform with respect to a form, such as entering data into fields, selecting user interface controls displayed on the form and so on.

Any type of human activity/interaction with a form that does not correspond with a life cycle stage of the process can be considered a point that is between life cycle stages. Examples of such human activities that are between life-cycle stages can include entering data into a field, selecting buttons, selecting drop down menus, selecting tabs, and so on.

According to one embodiment, service activity can be represented as an icon that looks like a gear and a human activity can be represented by an icon that looks like a human.

This process graph 210 depicts just one example of a process 170 (FIG. 1) that can be designed. The user interface 200 could be used for designing any kind of process 170 that includes, for example, activities that diverge, join, are sequential, parallel and so on, as understand by individuals who are skilled in the art of designing processes.

A process 170 (FIG. 1) is a series of operations, according to one embodiment. The operations can be sequential, parallel, merging, diverging among other things. Some of the operations can be human operations that are performed by humans. A form may be displayed to a human and the human may perform operations with respect to the form. The operations may be any type of operation that a human may perform with respect to a form, as discussed herein. A first person creates something using a form, updates the form, enters data into the form and a second person may approve the actions of the first person. For example, the first person may create a budget line item for a quarter and the second person may approve that budget line item. The budget line item and the ability to approve it are represented in a way that humans can understand, for example, using a form that humans can see and interact with. According to one embodiment, a process modeler designs the form 180 (FIG. 1), the process of using the form, and the human and system interactions on the form, for example, using a user interface 200 (FIG. 2).

The user interface 200 enables modeling a process 170 graphically. More specifically, graphical representations 201-209 are used to represent activities, inputs and outputs with respect to those activities, as discussed herein. Icons 201-205 represent the activities and the arrows 206-209 represent the inputs and outputs with respect to those activities associated with those icons 201-205. Arrow 206 represents output of start 201 and input to service 202. Arrow 207 represents output of service 202 and input to submit 203. Arrow 208 represents output of submit 203 and input to service 204. Arrow 209 represents output of service 204 and input to end 205.

A process modeler can use the user interface 200 to program the process 170. The user interface 200 can be used to program a process 170 with various features, such as logic, functions, modules, variables, computer executable instructions. Any type of feature that is known in the art of programming can be specified. Therefore, according to one embodiment, the process design user interface 151 defines the process user interface 160.

For the sake of simplicity, the respective icons 201-205 shall be referred to as start process icon, service icon, submit icon, service icon, and end process icon.

Data Association User Interface

Figure 3:
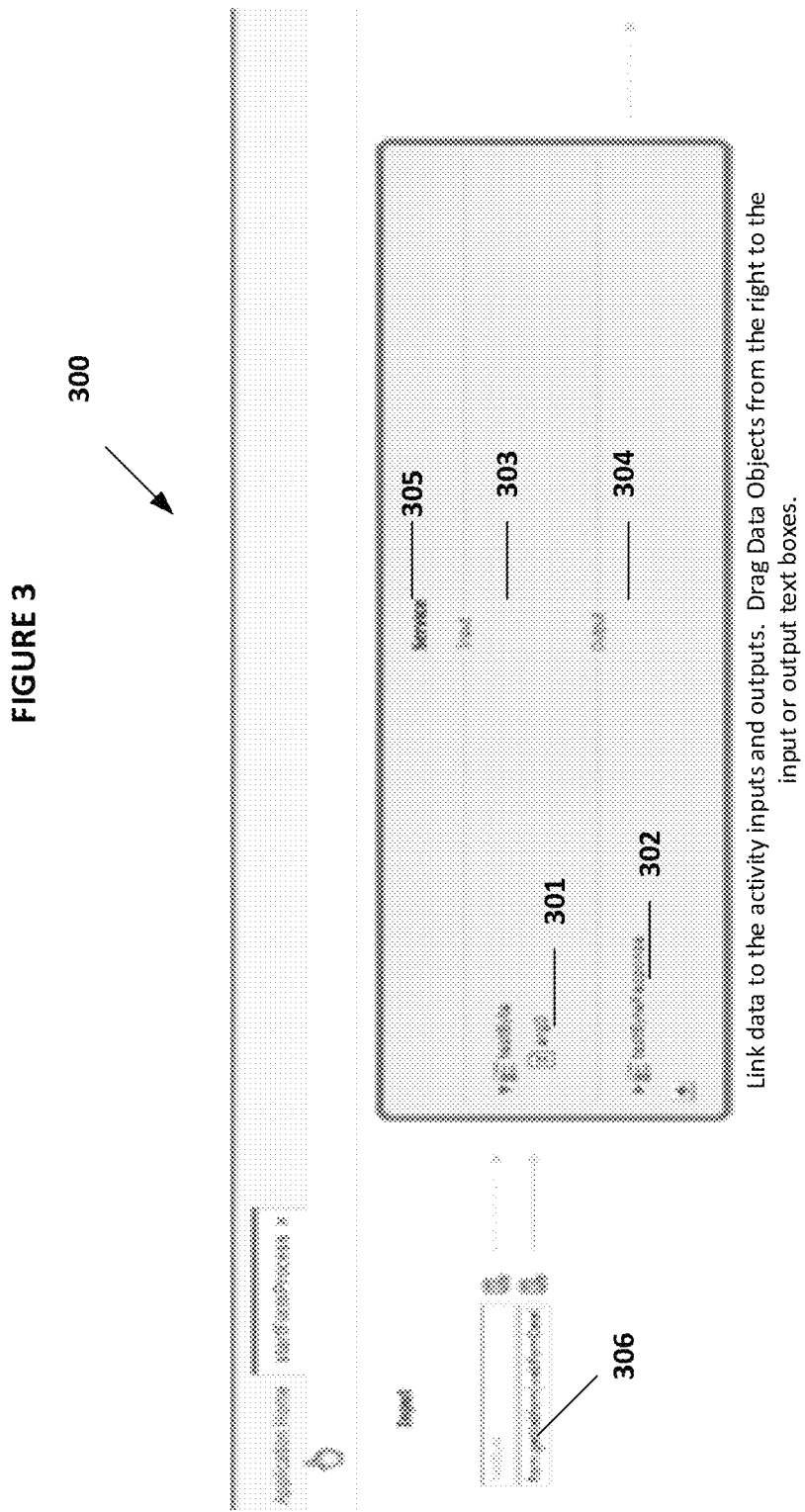
FIG. 3 is a block diagram of a user interface for specifying data associations, according to one embodiment.

FIG. 3 is a block diagram of a user interface 300 for specifying data associations, according to one embodiment. The user interface 300 is an example of the data association user interface 130 (FIG. 1).

For example, a process modeler can interact with the user interface 300 to specify the inputs and outputs 206-209, as discussed herein, with respect to various activities 201-205. The user interface 300 can be used to map values to inputs and outputs of activities 201-205. For example, icon 301 represents an input 303 and icon 302 represents an output 304 used for a service activity 305. Field 306 can be used to enter snapshot instructions, such as a getWebForm function or XPath function, as discussed herein.

In a specific example, the input field 303 can be used to specify the inputs 206 to the service 202, the output field 304 can be used to specify the outputs 207 for that service 202, and field 306 can be used to create and associate snapshot instructions 152 with the service 202. In a similar manner, the data association user interface 300 can be used to specify the input 208, the output 209, and the snapshot instructions 152 for service 204.

An example of an input for the service icon 202 is that the start process icon 201 proceeds into the service icon 202. An example of an output for service icon 202 is that the service icon 202 proceeds to the submit icon 203. Other types of information can also be associated with the inputs and the outputs.

According to one embodiment, user interfaces 200 and 300 are used as a part of creating the form 180. According to one embodiment, user interfaces 200 and 300 can be displayed simultaneously on a display screen.

One or more data structures can be used to store information that is provided via the data association user interface 130, 300. For example, one or more of the input(s), output(s), and the snapshot instructions for a particular service icon 202, 204 can be stored in one or more data structures. In one embodiment, one or more data structures can store one or more of the input(s), output(s), snapshot instructions, information specifying icons 201-205 and their arrangements in a graph 210. One or more data structures can be used to store any or all information associated with and provided by the user interface 130, 300, and 200.

Illustration of a Method

Figure 4:
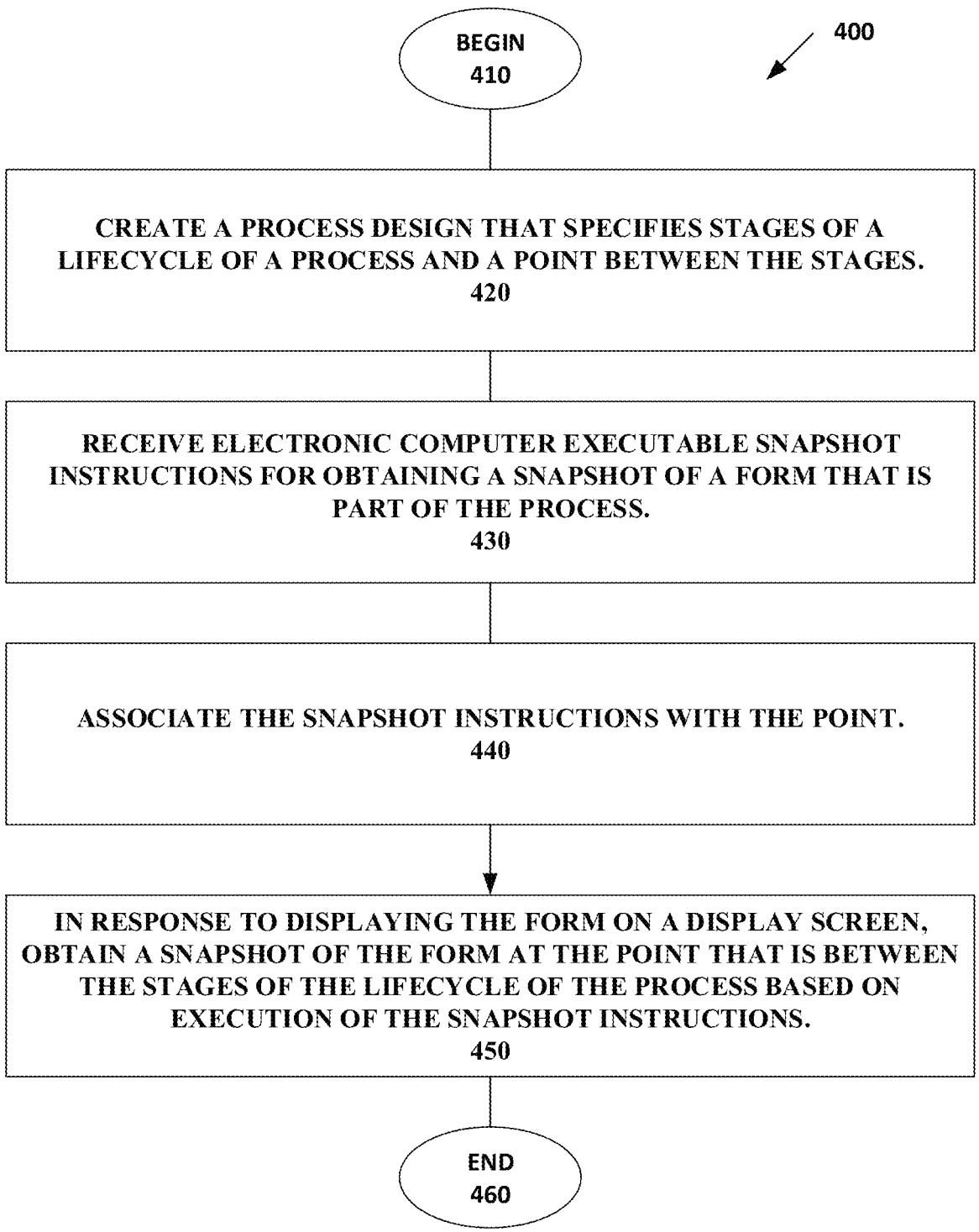
FIG. 4 depicts a flowchart of a method of providing snapshots of a form, according to one embodiment.

FIG. 4 depicts a flowchart 400 of a method of providing snapshots of a form, according to one embodiment.

Although specific operations are disclosed in flowchart 400, such operations are exemplary. That is, embodiments of the present invention are well suited to performing various other operations or variations of the operations recited in flowchart 400. It is appreciated that the operations in flowchart 400 may be performed in an order different than presented, and that not all of the operations in flowchart 400 may be performed.

At 410, the method starts.

At 420, create a process design that specifies stages of a lifecycle of a process and a point between the stages.

For example, referring to FIG. 1, the process modeler 191 interacts with the process design creation user interface 120 via the client device 192 to create a process design 151 (FIG. 1), 200 (FIG. 2). The process design 151, 200 specifies stages 201 and 205 of a lifecycle of a process 170 and a point 203 between the stages 201 and 205. The process design creation user interface 120 stores the created process design in hardware memory 150 as process design user interface 151.

At 430, receive electronic computer executable snapshot instructions for obtaining a snapshot of a form that is part of the process.

For example, the process modeler 191 interacts with the data association user interface 130 (FIG. 1), 300 (FIG. 3) to create electronic computer executable snapshot instructions 152. More specifically, the process modeler 191 can enter the snapshot instructions into the field 306 of the data association user interface 130, 300. The snapshot instructions in the field 306 are stored in the hardware memory 150 as snapshot instructions 152.

The process modeler 191 can also use the data association user interface 130, 300 to specify the inputs and outputs, as discussed herein. The receive inputs and outputs logic 131 (FIG. 1) can receive the inputs and outputs from the fields 303 and 304 (FIG. 3) for a specified service 202 or 204 (FIG. 2), as discussed herein.

At 440, associate the snapshot instructions with the point.

For example, the receive snapshot instructions logic 132 (FIG. 1) can receive the snapshots instructions entered in the field 306 (FIG. 3) and store those snapshot instructions in hardware memory 150 (FIG. 3) as snapshot instructions 152 (FIG. 1).

Further, the associate snapshot instruction logic 133 (FIG. 1) can associate the snapshot instructions entered into field 306 (FIG. 3) with the service 202, 204 (FIG. 2) that the data entered into user interface 300 (FIG. 3) is being entered for. For example, the process modeler can click on an icon 202 or 204 causing the user interface 300 to be displayed for the respective services and then enter the inputs, outputs, and snapshot instructions for the service associated with that icon 202 or 204. Alternatively, the process modeler 191 can drag and drop activities into fields. For example, the process modeler 191 could drag and drop service 202 into the service field 305, and the start 201 into the input field 303 and drag and drop the submit 203 into the output field 304, thus, indicating that start 201 is an input to service 202 and submit 203 is an output for service 202.

These are just two examples of how to associate the inputs, outputs, and snapshot instructions with a particular service 202, 204.

At 450, in response to displaying the form on a display screen, obtain a snapshot of the form at the point that is between stages the lifecycle of the process based on execution of the snapshot instructions.

For example, the user 193 can cause the form 180 of the process user interface 160 to be displayed on their client device 194, as depicted in FIG. 1. When the user 193 (FIG. 1) clicks on the button 181 (FIG. 1) to start a process or task, a snapshot is not taken of form 180 (FIG. 1) because no snapshot instructions are associated with start process/task icon 201 (FIG. 2). Processing proceeds to service 202 (FIG. 2). A snapshot is taken of form 180 (FIG. 1) because snapshot instructions 152 (FIG. 1) are associated with the service icon 202 (FIG. 2). Assume in this illustration that the snapshot depicts that the submit button 181 (FIG. 1) on the form 180 (FIG. 1) is not highlighted because the user 193 (FIG. 1) has not clicked on it. The obtain snapshot logic 140

(FIG. 1) provides the snapshot to the server 195 (FIG. 1) that is outside PCS 102 (FIG. 1). The obtained snapshot is stored as snapshot 196 on the server 195.

Referring to FIGS. 1 and 2, when the user 193 clicks on the submit button 182 of the form 180, a snapshot is not taken of the form 180 because no snapshot instructions 152 are associated with the submit icon 203. Processing proceeds to service 205. A snapshot is taken of form 180 because snapshot instructions 152 are associated with the service icon 204. The obtain snapshot logic 140 provides the second snapshot to the server 195 where it is also stored.

Assume in this illustration, that the form 180 has changed in some manner due to the user 193 clicking on the submit button 181. For example, the second snapshot may depict that the submit button 181 has been highlighted or a message, such as "form has been submitted" may appear on the form 180. When the user 193 clicks on the end process/task icon 183, no snapshot is taken because snapshot instructions 152 are not associated with the end process/task icon 183.

In another example, the human activity 203 may be that the user 193 has entered text into a data entry field of the form 180. In this case, the snapshot taken by service 202 may show the data entry field is empty and the snapshot taken at service 204 may depict that the data entry field now has the text that the user 193 entered into it.

The form is displayed on a display screen of the client device 194, for example. The display screen is at least partially hardware. The display screen can be any type of screen for displaying a form to a human. The display screen may be a touch display screen or a non-touch display screen. The display screen communicates with a computer device 194, such as a desktop, laptop, personal digital assistant (PDA), or mobile phone.

At 460, the method ends.

The above illustration is only provided by way of example and not by way of limitation. There are other ways of performing the method described by flowchart 400.

The operations depicted in FIG. 4 can be implemented as computer readable instructions, hardware or firmware. According to one embodiment, a system 100 can perform one or more of the operations depicted in FIG. 4. According to one embodiment, one or more of the operations depicted in FIG. 4 may be performed by another system. The other system can include hardware, such as a central processing unit, for executing computer readable instructions.

An embodiment provides for storing the snapshot in a format that is human readable. More specifically, an embodiment provides for wherein the storing further comprises: storing the snapshot in a format that is selected from a group consisting of Portable Document Format (PDF) and Portable Game Notation (PGN). An example of a snapshot is snapshot 196 (FIG. 1).

An embodiment provides for performing the displaying and the obtaining as part of a process cloud system (PCS). For example, the user interface 160 in PCS 101 causes the form 180 to be displayed on the client device 194 and the obtain snapshot logic 140, which is also inside of PCS 101, invokes the snapshot instructions 152. Execution of the snapshot instructions 152 causes a snapshot of the form 180 to be stored as snapshot 196 outside of PCS 102.

An embodiment provides for storing the snapshot outside of the PCS. Snapshot 196 is an example of a snapshot copy that is stored outside of PCS 101.

An embodiment provides for providing a copy of the snapshot to a customer of PCS. The snapshot 196 is provided to a user 191 or 193, or some other user, who is a customer of PCS 101.

An embodiment provides for obtaining the snapshot with an XPath function. An example of an Xpath function is depicted in Table 1.

An embodiment provides for wherein the obtaining of the snapshot further comprises: obtaining the snapshot using a getWebForm service call. The following are examples of getWebForm service calls:

Form.getWebForm(bpmn:getDataObject('customer'), 'PDF', 'f1')—this returns PDF stream of form 'f1'. "bpm" can be replaced by "pcs."

Form.getWebForm(bpmn:getDataObject('customer'))— Figures out associated form of data object 'customer' as 'f1' and returns f1 snapshot as PDF stream.

An embodiment provides for wherein the obtaining of the snapshot further comprises: obtaining snapshots before and after a human interaction with the form that does not correspond with the stages. For example, snapshots are obtained at service 202 that is before human interaction associated with icon 203 and at service 204 that is after the human interaction associated with icon 203.

An embodiment provides for wherein the creating of the process design that specifies the stages of the lifecycle of the process and the point between the stages further comprises: creating a design graph that specifies icons for the stages, an icon for the human interaction, and an icon for a service that corresponds with the point; receiving input, output, and the snapshot instructions; and associating the snapshot instructions with the icon for the service. For example, the design graph 210 is created that specifies the icons 201 and 202 of the stages, an icon 203 of the human interaction of clicking on a submit button 182 (FIG. 1) and an icon 202 or 204 for a service that corresponds with the point that is between the stages. Inputs, outputs, and snapshot instructions, for example, from fields 303, 304, and 306, are received. The associate snapshot instructions logic 133 associates the snapshot instructions that are received from field 306 with the icon 202 or 204 for the service.

A Computer Readable Medium and an Apparatus

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more hardware processors of the computer system. When executed, the instructions cause a computer system to implement the functionality of various embodiments of the present invention. For example, the instructions can be executed by a hardware processor, such as a central processing unit, associated with the computer system. The tangible processor-readable storage device is hardware memory. According to one embodiment, the hardware processor is a digital processor that is capable of executing instructions in the form of digital signals, such as, binary 1s and 0s.

An embodiment provides for a non-transitory computer readable medium including instructions for a method of providing snapshots of a form executable by a digital processor, the non-transitory computer readable medium including one or more instructions for: creating a process design that specifies stages of a lifecycle of a process and a point between the stages; receiving electronic computer executable snapshot instructions for obtaining a snapshot of a form that is part of the process; associating the snapshot instructions with the point; and in response to displaying the form on a display screen, obtaining a snapshot of the form at the point that is between the stages the lifecycle of the process based on execution of the snapshot instructions.

An apparatus comprising: one or more digital processors; and a tangible processor-readable storage device including instructions for: creating a process design that specifies stages of a lifecycle of a process and a point between the stages; receiving electronic computer executable snapshot instructions for obtaining a snapshot of a form that is part of the process; associating the snapshot instructions with the point; and in response to displaying the form on a display screen, obtaining a snapshot of the form at the point that is between stages the lifecycle of the process based on execution of the snapshot instructions.

Example Computer Environment

Figure 5:
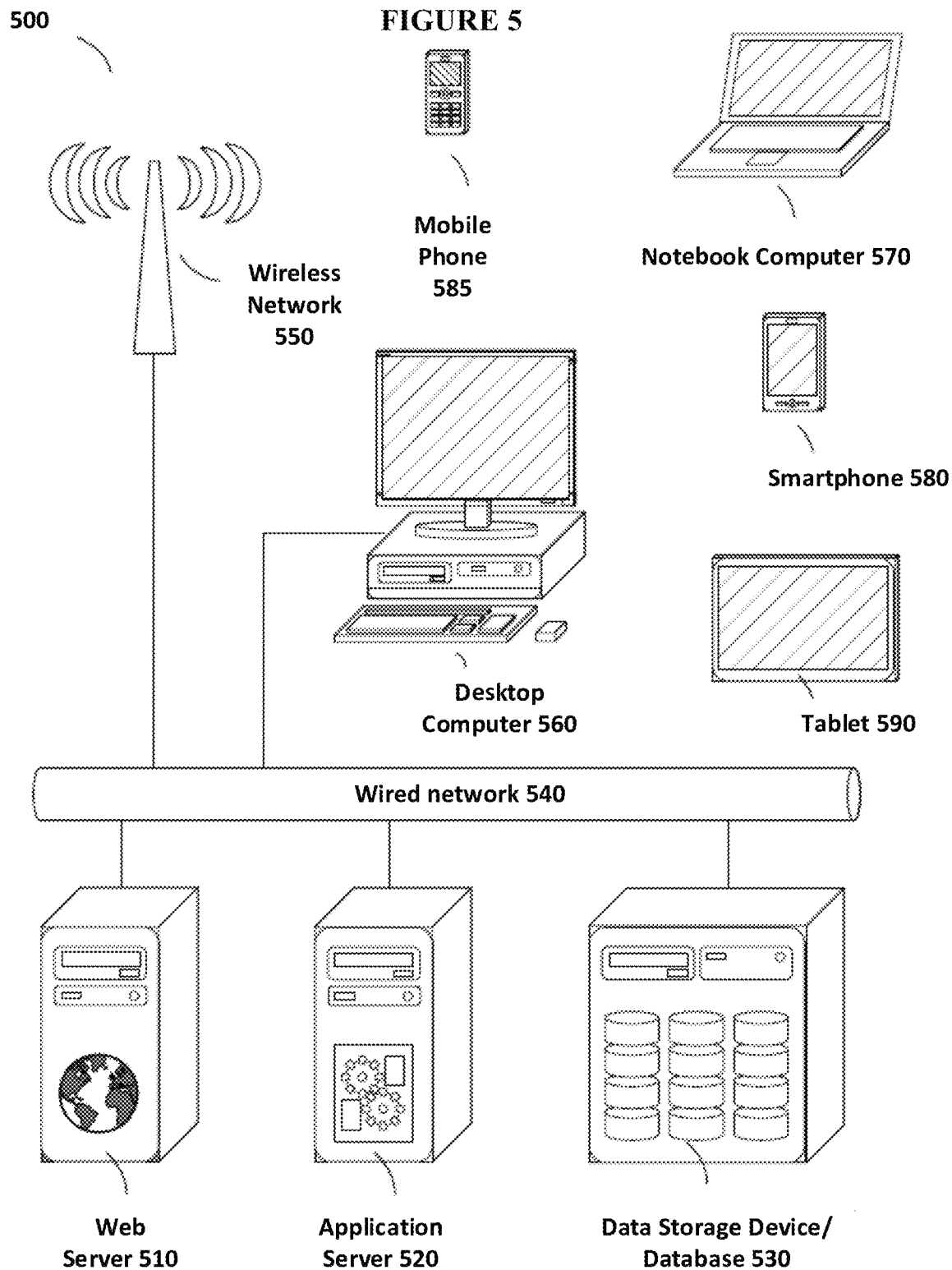
FIG. 5 is a general block diagram of a system and accompanying computing environment usable to implement the embodiments of FIGS. 1-4, according to one embodiment.

FIG. 5 is a general block diagram of a system 500 and accompanying computing environment usable to implement the embodiments of FIGS. 1-4, according to one embodiment. The example system 500 is capable of supporting or running various hardware and/or software modules and associated methods discussed with reference to FIGS. 1-4. Note that certain embodiments may be implemented using one or more standalone applications (for example, residing in a user device) and/or one or more web-based applications implemented using a combination of client-side and server-side code.

The general system 500 includes user devices 560-590, including desktop computers 560, notebook computers 570, smartphones 580, mobile phones 585, and tablets 590. The general system 500 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 500 is shown with five user devices, any number of user devices can be supported.

A web server 510 is used to process requests from web browsers and standalone applications for web pages, electronic documents, enterprise data or other content, and other data from the user computers. The web server 510 may also provide push data or syndicated content, such as RSS feeds, of data related to enterprise operations.

An application server 520 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 520 are adapted to process input data and user computer requests and can store or retrieve data from data storage device or database 530. Database 530 stores data created and used by the data applications. In an embodiment, the database 530 includes a relational database that is adapted to store, update, and retrieve data in response to SQL format commands or other database query languages. Other embodiments may use unstructured data storage architectures and NoSQL (Not Only SQL) databases.

In an embodiment, the application server 520 includes one or more general-purpose computers capable of executing programs or scripts. In an embodiment, web server 510 is implemented as an application running on the one or more general-purpose computers. The web server 510 and application server 520 may be combined and executed on the same computers.

An electronic communication network 540-550 enables communication between user computers 560-590, web server 510, application server 520, and database 530. In an embodiment, networks 540-550 may further include any form of electrical or optical communication devices, including wired network 540 and wireless network 550. Networks 540-550 may also incorporate one or more local-area networks, such as an Ethernet network, wide-area networks, such as the Internet; cellular carrier data networks; and virtual networks, such as a virtual private network.

The system 500 is one example for executing applications according to an embodiment of the invention. In another embodiment, web server 510, application server 520, and optionally database 530 can be combined into a single server computer application and system. In a further embodiment, virtualization and virtual machine applications may be used to implement one or more of the web server 510, application server 520, and database 530.

In still further embodiments, all or a portion of the web and application serving functions may be integrated into an application running on each of the user computers. For example, a JavaScript application on the user computer may be used to retrieve or analyze data and display portions of the applications.

With reference to FIG. 1, client devices 192, 194 can be implemented on a client computing device, such as a desktop computer 560, notebook computer 570, smartphone 580, mobile phone 585, tablet 590, of FIG. 5 and/or other computing devices. In a particular example embodiment, the user computing devices 560-590 run browsers, e.g., used to display the user interfaces. User interfaces 120, 130, 300, 160 may be viewed from a client computing device, such as a desktop computer 560, notebook computer 570, smartphone 580, mobile phone 585, tablet 590, of FIG. 5 and/or other computing devices In a particular example embodiment, browsers of the desktop computer 560, notebook computer 570, smartphone 580, mobile phone 585, tablet 590 of FIG. 5 connect to the Internet, represented by the wired network 540 and/or wireless network 550 as shown in FIG. 5, to access one or more network-coupled servers, databases, and/or associated cloud-based functionality, as represented by the modules of FIG. 1. For example, one or more of the web server 510 and/or application server 520 shown in FIG. 5 may be used to host software corresponding to apparatus 110 and/or server 195 of FIG. 1, as discussed herein. One or more databases 530 as shown in FIG. 5 may be used to host hardware memory 150.

Figure 6:
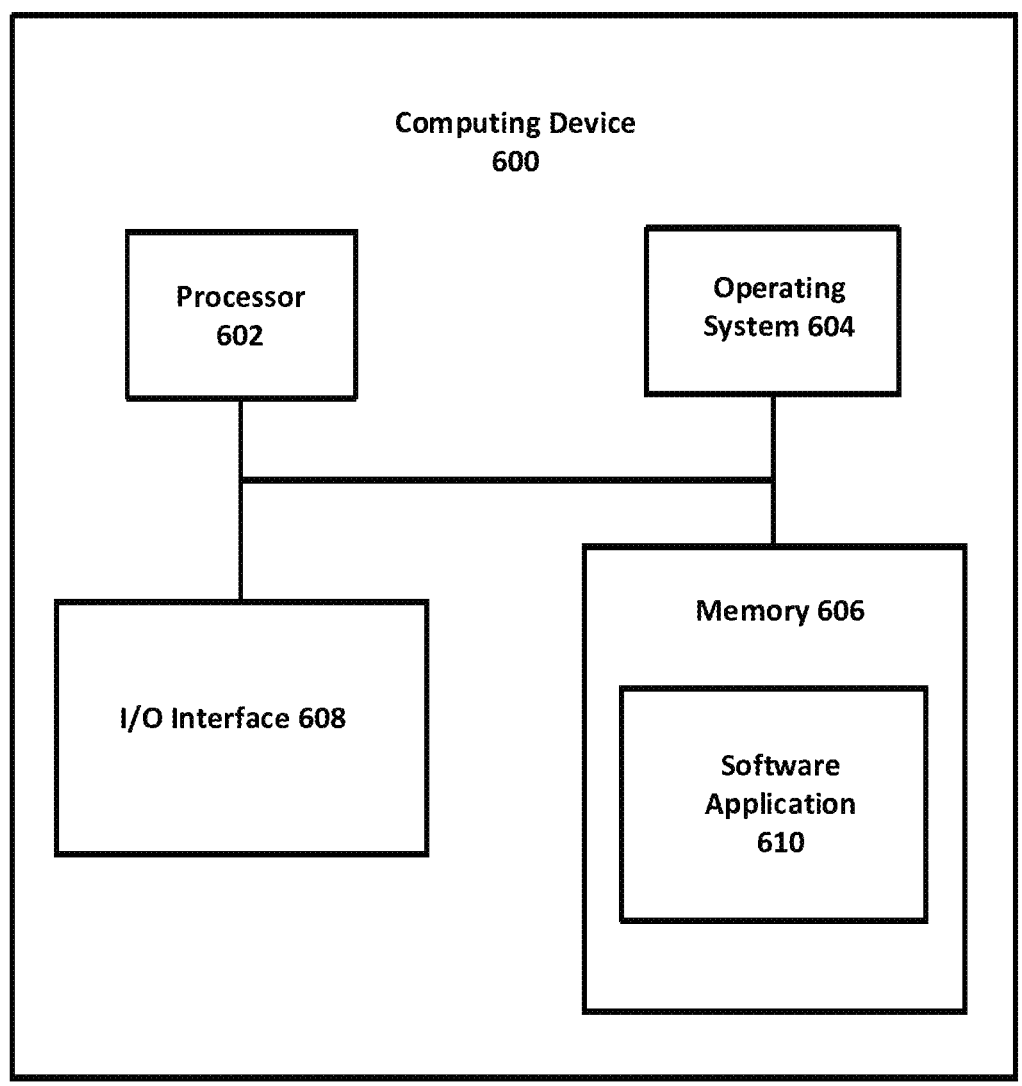
FIG. 6 is a general block diagram of a computing device usable to implement the embodiments described herein, according to one embodiment.

FIG. 6 is a general block diagram of a computing device 600 usable to implement the embodiments described herein, according to one embodiment. While the computing device 600 of FIG. 6 may be described as performing one or more of the steps in the embodiments herein, in other embodiments any suitable component or combination of components of the computing device 600 or any suitable hardware processor or hardware processors associated with system 600 may facilitate performing the steps.

FIG. 6 illustrates a block diagram of an example computing system 600, which may be used for implementations described herein. For example, computing system 600 may be used to implement user devices 560-590, and server devices 510, 520 of FIG. 5 as well as to perform the method implementations described herein. In some implementations, computing system 600 may include a hardware processor 602, an operating system 604, a memory 606, and an input/output (I/O) interface 608. In various implementations, processor 602 may be used to implement various functions and features described herein, as well as to perform the method implementations described herein. While processor 602 is described as performing implementations described herein, any suitable component or combination of components of system 600 or any suitable hardware processor or hardware processors associated with system 600 or any suitable system may perform the steps described. Implementations described herein may be carried out on a user device, on a server, or a combination of both.

Computing device 600 also includes a software application 610, which may be stored on memory 606 or on any other suitable storage location or computer-readable medium. Software application 610 provides instructions that enable processor 602 to perform the functions described herein and other functions. The components of computing system 600 may be implemented by one or more hardware processors or any combination of hardware devices, as well as any combination of hardware, software, firmware, etc.

For ease of illustration, FIG. 6 shows one block for each of processor 602, operating system 604, memory 606, I/O interface 608, and software application 610. These blocks 602, 604, 606, 608, and 610 may represent multiple hardware processors, operating systems, memories, I/O interfaces, and software applications. In various implementations, computing system 600 may not have all of the components shown and/or may have other elements including other types of components instead of, or in addition to, those shown herein.

The entities 110, 192, 195 (FIG. 1) may be hardware computing systems, such as 600 or they may be virtual machines executed on one or more hardware computing systems, such as 600. Further, hardware computing systems, such as 600, or one or more virtual machines can be used for executing process user interface 160 (FIG. 1).

Conclusion

Although the description has been described with respect to particular embodiments thereof, these particular embodiments are merely illustrative, and not restrictive. For example, other types of cloud services besides PCS could be used, such as service now or sales force. Various processes, user interfaces and so on were provided for the sake of illustration. Various embodiments are well suited for other processes and other user interfaces that could be used as part of obtaining snapshots of forms at various points of a process.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more hardware processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Various embodiments can be provided with logic encoded in one or more tangible media for execution by one or more hardware processors operable to perform the various embodiments described herein.

The embodiments are substantially described herein.

We claim:

1. A non-transitory computer readable medium including instructions for a method of providing snapshots of a form executable by a digital processor, the non-transitory computer readable medium including one or more instructions for:
receiving information from a process modeler user interface;
creating, based on the received information, a process design that specifies stages of a lifecycle of a process and a point between the stages;

receiving, from the process modeler user interface, electronic computer executable snapshot instructions for obtaining a snapshot of a displayable form that is part of the process;

associating the snapshot instructions with the point that is between the stages;

displaying the form on a display screen; and in response to processing proceeding to a service associated with the point between the stages, performing the obtaining of the snapshot of the displayed form at the point that is between the stages of the lifecycle of the process based on execution of the snapshot instructions.

2. The non-transitory computer readable medium as recited by claim 1, wherein the method further comprises:

storing the snapshot in a format that is human readable.

3. The non-transitory computer readable medium as recited by claim 2, wherein the storing further comprises:

storing the snapshot in a format that is selected from a group consisting of Portable Document Format (PDF) and Portable Game Notation (PGN).

4. The non-transitory computer readable medium as recited by claim 1, wherein the method further comprises:

performing the displaying and the obtaining as part of a process cloud system (PCS).

5. The non-transitory computer readable medium as recited by claim 4, wherein the method further comprises:

storing the snapshot outside of the PCS.

6. The non-transitory computer readable medium as recited by claim 5, wherein the method further comprises:

providing a copy of the snapshot to a customer of PCS.

7. The non-transitory computer readable medium as recited by claim 1, wherein the obtaining of the snapshot further comprises:

obtaining the snapshot with an XPath function.

8. The non-transitory computer readable medium as recited by claim 1, wherein the obtaining of the snapshot further comprises:

obtaining the snapshot using a getWebForm service call.

9. The non-transitory computer readable medium as recited by claim 1, wherein the obtaining of the snapshot further comprises:

obtaining snapshots before and after a human interaction with the form that does not correspond with the stages.

10. The non-transitory computer readable medium as recited by claim 9, wherein the creating of the process design that specifies the stages of the lifecycle of the process and the point between the stages further comprises:

creating a design graph that specifies icons for the stages, an icon for the human interaction, and an icon for a service that corresponds with the point;

receiving input, output, and the snapshot instructions; and associating the snapshot instructions with the icon for the service.

11. A method of providing snapshots of a form, wherein the method comprises:

receiving information from a process modeler user interface;

creating, based on the received information, a process design that specifies stages of a lifecycle of a process and a point between the stages;

receiving, from the process modeler user interface, electronic computer executable snapshot instructions for obtaining a snapshot of a displayable form that is part of the process;

associating the snapshot instructions with the point that is between the stages;

displaying the form on a display screen; and in response to processing proceeding to a service associated with the point between the stages, performing the obtaining of the snapshot of the displayed form at the point that is between the stages of the lifecycle of the process based on execution of the snapshot instructions.

12. The method as recited by claim 11, wherein the method further comprises:

storing the snapshot in a format that is human readable.

13. The method as recited by claim 12, wherein the storing further comprises:

storing the snapshot in a format that is selected from a group consisting of Portable Document Format (PDF) and Portable Game Notation (PGN).

14. The method as recited by claim 11, wherein the method further comprises:

performing the displaying and the obtaining as part of a process cloud system (PCS).

15. The method as recited by claim 14, wherein the method further comprises:

storing the snapshot outside of the PCS.

16. The method as recited by claim 15, wherein the method further comprises:

providing a copy of the snapshot to a customer of PCS.

17. The method as recited by claim 11, wherein the obtaining of the snapshot further comprises:

obtaining the snapshot with mechanism selected from a group consisting of an XPath function and getWebForm service call.

18. The method as recited by claim 11, wherein the obtaining of the snapshot further comprises:

obtaining snapshots before and after a human interaction with the form that does not correspond with the stages.

19. The method as recited by claim 11, wherein the creating of the process design that specifies the stages of the lifecycle of the process and the point between the stages further comprises:

creating a design graph that specifies icons for the stages, an icon for the human interaction, and an icon for a service that corresponds with the point;

receiving input, output, and the snapshot instructions; and associating the snapshot instructions with the icon for the service.

20. An apparatus comprising:

one or more digital processors; and a tangible processor-readable storage device including instructions for:

receiving information from a process modeler user interface;

creating, based on the received information, a process design that specifies stages of a lifecycle of a process and a point between the stages;

receiving, from the process modeler user interface, electronic computer executable snapshot instructions for obtaining a snapshot of a displayable form that is part of the process;

associating the snapshot instructions with the point that is between the stages;

displaying the form on a display screen; and in response to processing proceeding to a service associated with the point between the stages, performing the obtaining of the snapshot of the displayed form at the point that is between the stages of the lifecycle of the process based on execution of the snapshot instructions.

* * * * *